(12) United States Patent
Siegel et al.

(10) Patent No.: US 8,986,642 B2
(45) Date of Patent: Mar. 24, 2015

(54) METAL OXIDE OR SEMIMETAL OXIDE SPHERICAL BEADS, A PROCESS FOR MAKING, AND A PROCESS FOR USING

(71) Applicant: BASF SE, Ludwigshafen (DE)

(72) Inventors: Angela Siegel, Nienburg/Weser (DE); Tobias Eckardt, Nienburg/Weser (DE); Andreas Braedikow, Nienburg/Weser (DE); Thorsten Puvogel, Nienburg/Weser (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/770,577

(22) Filed: Feb. 19, 2013

(65) Prior Publication Data

US 2013/0165608 A1 Jun. 27, 2013

Related U.S. Application Data

(62) Division of application No. 13/255,546, filed as application No. PCT/EP2010/052965 on Mar. 9, 2010, now abandoned.

(30) Foreign Application Priority Data

Mar. 16, 2009 (EP) .................... 09155231

(51) Int. Cl.
| | | |
|---|---|---|
| *C03C 11/00* | (2006.01) | |
| *C01B 33/193* | (2006.01) | |
| *C08F 4/02* | (2006.01) | |
| *C08F 4/00* | (2006.01) | |
| *B01J 21/08* | (2006.01) | |
| *B01J 35/02* | (2006.01) | |
| *B01J 35/08* | (2006.01) | |
| *B01J 35/10* | (2006.01) | |
| *B01J 37/03* | (2006.01) | |
| *C01B 13/32* | (2006.01) | |
| *C01B 33/16* | (2006.01) | |
| *C01B 33/187* | (2006.01) | |
| *B01J 23/24* | (2006.01) | |
| *B01J 23/40* | (2006.01) | |
| *B01J 23/70* | (2006.01) | |
| *C08F 110/02* | (2006.01) | |
| *C08F 110/06* | (2006.01) | |

(52) U.S. Cl.
CPC ............ *C01B 33/193* (2013.01); *C08F 4/02* (2013.01); *C08F 4/00* (2013.01); *B01J 21/08* (2013.01); *B01J 35/023* (2013.01); *B01J 35/08* (2013.01); *B01J 35/1019* (2013.01); *B01J 35/1023* (2013.01); *B01J 37/031* (2013.01); *C01B 13/328* (2013.01); *C01B 33/166* (2013.01); *C01B 33/187* (2013.01); *B01J 23/24* (2013.01); *B01J 23/40* (2013.01); *B01J 23/70* (2013.01); *C01P 2004/32* (2013.01); *C01P 2004/52* (2013.01); *C01P 2004/54* (2013.01); *C01P 2004/61* (2013.01); *C01P 2006/12* (2013.01); *C01P 2006/14* (2013.01); *C08F 110/02* (2013.01); *C08F 110/06* (2013.01)
USPC ........... 423/335; 423/339; 423/610; 423/625; 423/636

(58) Field of Classification Search
None
See application file for complete search history.

(56) References Cited

U.S. PATENT DOCUMENTS

| | | | |
|---|---|---|---|
| 2,757,073 A | 7/1956 | Drexel | |
| 2,921,839 A | 1/1960 | Ritter | |
| 3,258,311 A * | 6/1966 | Martin et al. | ..................... 264/9 |
| 3,489,516 A | 1/1970 | Kummerle | |
| 4,713,338 A * | 12/1987 | Gonzalez et al. | ............. 435/176 |

FOREIGN PATENT DOCUMENTS

| | | |
|---|---|---|
| EP | 0653378 A1 | 5/1995 |
| GB | 2279944 A | 1/1995 |

OTHER PUBLICATIONS

International Preliminary Report on Patentability dated Sep. 20, 2011.
International Search Report dated Jun. 2, 2010.
Le, J., et al., "A Wet-chemical Method for the Synthesis of In-doped $CaZrO_3$ Ceramic Powders," Journal of the European Ceramic Society (1999), vol. 19, pp. 2589-2591.
Lee, M., et al., "Synthesis of spherical zirconia by precipitation between two water/oil emulsions," Journal of the European Ceramic Society (1999), vol. 19, pp. 2593-2603.

* cited by examiner

*Primary Examiner* — Steven Bos
(74) *Attorney, Agent, or Firm* — Drinker Biddle & Reath LLP

(57) ABSTRACT

The present invention relates to spherical beads comprising at least one metal and/or semimetal oxide, having a mean diameter in the range from 10 to 120 μm, a BET surface area in the range from 400 to 800 m²/g and a pore volume in the range from 0.3 to 3.0 cm³/g, wherein the diameter of a given bead at any one point of said bead deviates by less than 10% from the average diameter of said bead and the surface of said bead is substantially smooth, and also to a process for producing these spherical beads, to a particulate catalyst comprising the spherical beads and to the use of the spherical beads as catalysts or catalyst carriers.

6 Claims, 2 Drawing Sheets ically to spherical beads comprising SiO2 (silica).

METAL OXIDE OR SEMIMETAL OXIDE SPHERICAL BEADS, A PROCESS FOR MAKING, AND A PROCESS FOR USING

CROSS-REFERENCE TO RELATED APPLICATIONS

This application is a divisional application of U.S. patent application Ser. No. 13/255,546, filed Sep. 9, 2011, which is a National Stage entry of PCT/EP2010/052965, filed Mar. 9, 2010, which claims benefit of European application 09155231.5, filed Mar. 16, 2009, all of which are incorporated herein by reference in their entirety.

BACKGROUND OF THE INVENTION

The present invention relates to spherical beads comprising at least one metal and/or semimetal oxide, having a diameter in the range from 10 to 120 μm, a BET surface area in the range from 400 to 800 $m^2/g$ and a pore volume in the range from 0.3 to 3.0 $cm^3/g$, wherein the diameter at no point of a given bead deviates by more than 10% from the average diameter of said bead and the surface of said bead is substantially smooth, to a process for producing these spherical beads and to the use of spherical beads as catalysts or catalyst carriers.

The present invention relates more particularly to spherical beads comprising $SiO_2$ (silica).

Silica particles and methods of making them are already known from the prior art. U.S. Pat. No. 2,757,073 discloses a process for making pulverulent silica gel wherein a dispersion of a silica gel sol is initially charged in a water-saturated organic solvent, for example butanol, and droplets of the silica gel sol are formed by vigorous stirring and converted by addition of ammonia into silica gel. The gel thus obtained is broken into small particles after hardening and the small particles are washed with water and with acetone to remove substantially all the water. U.S. Pat. No. 2,757,073 further discloses that such pulverulent silica can be used as a filler in materials such as rubber or as an intermediate for the preparation of coated silica products. The diameter of the silica beads thus obtained is less than 50 nm.

U.S. Pat. No. 2,921,839 discloses a method of producing finely divided silica particles by precipitation. To this end, an aqueous solution of an alkali metal silicate is admixed with an organic solvent and subsequently with an acid. After the organic phase has been separated off, the silica gel beads obtained are dried by azeotropic distillation. The method described in U.S. Pat. No. 2,921,839 provides silica gel particles having a diameter in the range from 10 to 1000 μm. U.S. Pat. No. 2,921,839 does not disclose any silica gel particles that are notable for a particularly high smoothness on their surface.

U.S. Pat. No. 3,489,516 discloses a method of producing silica beads by polymerization of $xNa_2O \cdot ySiO_2$ in a dispersed organic phase in an aqueous medium by addition of an acid. The silica beads thus produced have a BET surface area in the range from 700 to 1100 $m^2/g$ or in the range from 300 to 600 $m^2/g$. These silica beads can be used as catalysts.

There is no prior art describing silica particles, or their methods of making, that display a combination of diameter, BET surface area, pore volume, polydispersity and surface smoothness that is particularly suitable according to the present invention and that appears to make these particles particularly suitable for use as catalysts in polymerization reactions, for example for producing polypropylene or polyethylene. Nor is there prior art describing a process that provides spherical beads that display the recited advantageous combination of various parameters.

BRIEF SUMMARY OF THE INVENTION

It is an object of the present invention to provide spherical beads that have a particularly advantageous combination of the parameters mentioned. More particularly, the spherical beads shall have high smoothness for the bead surface, so that they are particularly advantageous for use as catalysts in polymerization reaction. A further object of the present invention is a process for producing such spherical beads.

We have found that these objects are achieved by spherical beads comprising at least one metal and/or semimetal oxide, having a mean diameter in the range from 10 to 120 μm, a BET surface area in the range from 400 to 800 $m^2/g$ and a pore volume in the range from 0.3 to 3.0 $cm^3/g$, wherein the diameter of a given bead at any one point of said bead deviates by less than 10% from the average diameter of said bead and the surface of said bead is substantially smooth.

We have found that these objects are further achieved by a process for producing these spherical beads of the present invention, comprising the steps:

(A) providing a mixture comprising at least one at least partially water-miscible organic solvent, water and at least one precursor compound of the at least one metal and/or semimetal oxide as mixture A, (B) providing a mixture comprising at least one at least partially water-miscible organic solvent, water and at least one acid as mixture B, (C) combining the mixtures A and B and reacting the at least one precursor compound of the at least one metal and/or semimetal oxide with said at least one acid to obtain a mixture C comprising an aqueous phase comprising the spherical beads and an organic phase, (D) separating the organic phase from the mixture C obtained in step C to obtain an aqueous phase comprising the spherical beads, (E) optionally treating the spherical beads obtained in step (D) with at least one acid, and (F) drying the spherical beads obtained in step (D) or (E).

We have found that the recited objects are also achieved by the use of the spherical beads of the present invention as catalysts or catalyst carriers.

A BRIEF DESCRIPTION OF THE FIGURES

A DETAILED DESCRIPTION OF THE INVENTION

Figure 1:
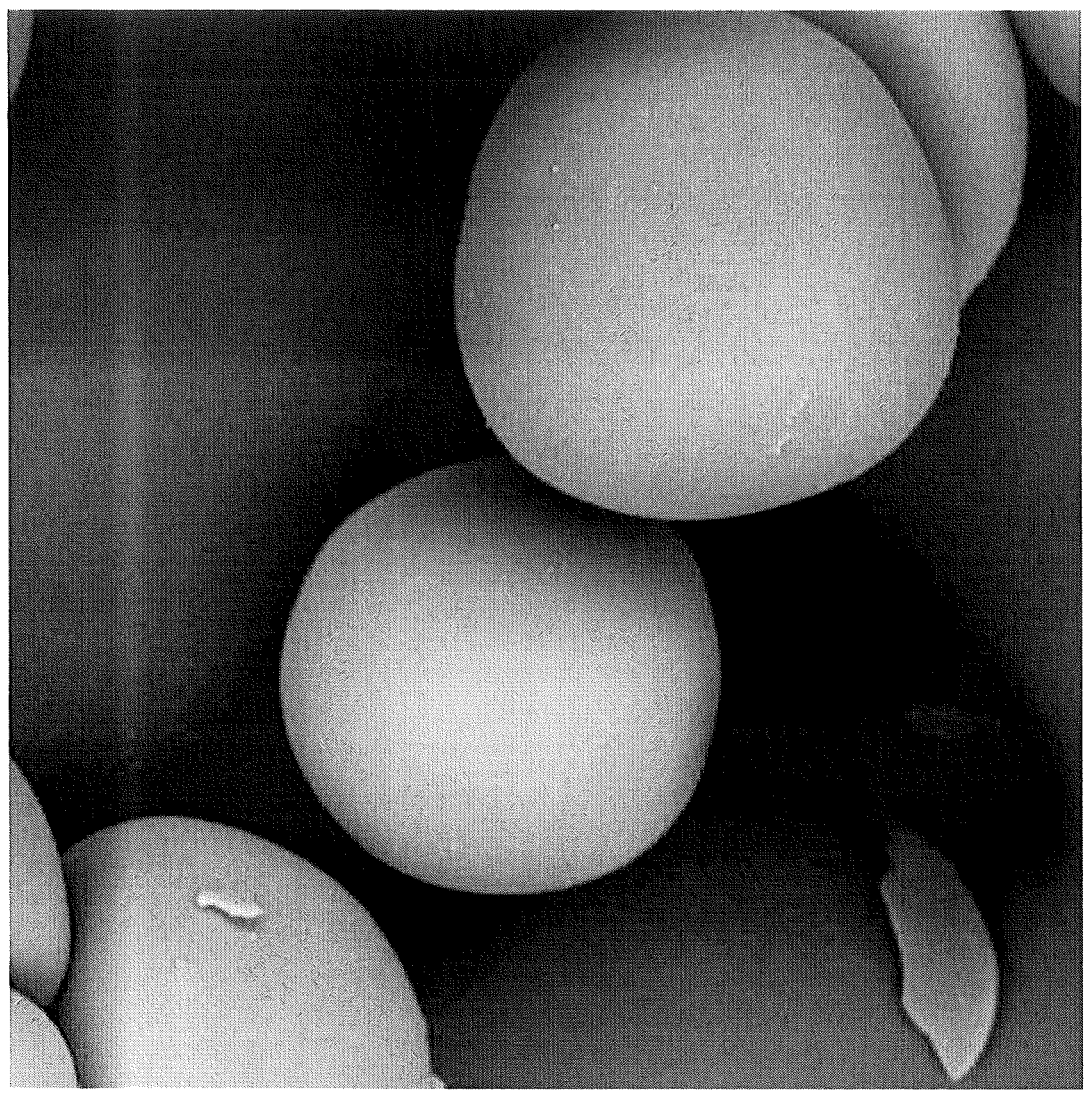
FIG. 1 shows inventive spherical beads as a scanning electron micrograph.

The spherical beads of the present invention comprise at least one metal and/or semimetal oxide.

In one preferred embodiment, the at least one metal and/or semimetal oxide is selected from the group consisting of $SiO_2$, $Al_2O_3$, $TiO_2$, MgO and mixtures thereof. In one particularly preferred embodiment, the spherical beads of the present invention comprise $SiO_2$. It is very particularly preferred for the spherical beads of the present invention to consist of $SiO_2$ to an extent of at least 96% by weight, particularly to an extent of at least 98% by weight. The remaining weight percentages can be accounted for by small amounts of further metals such as aluminum, sodium, iron and mixtures thereof, and also anions such as sulfate and/or chloride. These components in addition to $SiO_2$ are each present in an amount of less than 0.1% by weight.

The at least one metal and/or semimetal oxide is substantially amorphous; that is, the at least one metal and/or semimetal oxide is at least 80% amorphous and more preferably at least 90% amorphous. The fraction of amorphous regions can be determined by following methods known to a person skilled in the art, for example by X-ray diffraction (XRD).

The BET surface area of the spherical beads of the present invention is generally in the range from 400 to 800 m²/g, preferably in the range from 500 to 600 m²/g and more preferably in the range from 520 to 580 m²/g. The BET surface area can be determined by following methods known to a person skilled in the art, for example by $N_2$ physisorption measurements.

The mean diameter of the spherical beads of the present invention is generally in the range from 10 to 120 μm, preferably in the range from 30 to 100 μm, and most preferably in the range from 40 to 90 μm. Herein "mean diameter" is to be understood as the diameter averaged over all beads in a sample.

The $D_{10}$ value of the spherical particles of the present invention is generally in the range from 5 to 30 μm, preferably in the range from 10 to 25 μm and more preferably in the range from 12 to 20 μm. The $D_{50}$ value of the spherical particles of the present invention is generally in the range from 30 to 70 μm, preferably in the range from 40 to 65 μm and more preferably in the range from 50 to 60 μm. The $D_{90}$ value of the spherical particles of the present invention is generally in the range from 50 to 140 μm, preferably in the range from 75 to 120 μm and more preferably in the range from 80 to 100 μm.

The recited values $D_{10}$, $D_{50}$ and $D_{90}$ indicate that 10%, 50% and 90%, respectively, of the particles measured have a smaller diameter than the recited diameter. Methods of determining the mean diameter of the spherical beads are known to a person skilled in the art, for example Fraunhofer or Mie laser diffraction.

The pore volume of the spherical beads of the present invention is generally in the range from 0.3 to 3.0 cm³/g, preferably in the range from 0.8 to 2.5 cm³/g and most preferably in the range from 1.5 to 2.2 cm³/g. Methods of determining the pore volume of the spherical beads are known to a person skilled in the art, for example $N_2$-physisorption and Hg porosimetry measurements.

The spherical beads of the present invention are substantially monodisperse; that is, the spherical beads preferably have a narrow particle size distribution, as is clear from the recited $D_{10}$, $D_{50}$ and $D_{90}$ values.

The spherical beads of the present invention are generally notable for a particularly pronounced and uniform shape. The diameter of any one spherical bead of the present invention at any one point of this bead generally differs by less than 10%, preferably less than 5% and more preferably less than 2% from the average diameter of this bead. Herein "average diameter" is to be understood as meaning the diameter averaged over all diameters in a bead. The ideal case of a perfectly uniform sphere would mean that there is only one diameter for every bead. The spherical shape of the beads of the present invention can be determined by scanning electron micrographs.

The spherical beads of the present invention are further notable for the surface of these spherical beads being substantially smooth. Herein "smooth" is to be understood as meaning that the surface of the spherical beads of the present invention is free of any irregularities such as dents, fissures, faults, cracks, bulges, notches, etc. The smoothness of the particles of the present invention can be determined by scanning electron micrographs for example.

The present invention also provides a process for producing the spherical beads of the present invention, said process comprising the steps (A) to (F).

Step (A):

Step (A) comprises providing a mixture comprising at least one at least partially water-miscible organic solvent, water and at least one precursor compound of the at least one metal and/or semimetal oxide as mixture A.

The at least one at least partially water-miscible organic solvent is not completely miscible with water in one preferred embodiment.

The at least one at least partially water-miscible organic solvent is selected from the group consisting of ketones, ethers, alcohols, for example butanols, such as n-butanol, isobutanol, tert-butanol, vegetable oils, silicone oils, mineral oils and mixtures thereof. n-Butanol is particularly preferred. In one preferred embodiment, step (A) of the process of the present invention comprises using at least one at least partially water-miscible organic solvent which is water-saturated.

According to the present invention, the mixture A provided in step (A) of the process of the present invention comprises water. This water may be selected from tap water, drinking water, distilled water, demineralized water; preference is given to using distilled water.

The volume ratio of at least one at least partially water-miscible organic solvent to water in mixture A is generally in the range from 5:1 to 1:1 and preferably in the range from 4:1 to 2:1. One particularly preferred embodiment comprises initially charging the at least one organic solvent and adding the at least one precursor compound to the at least one metal or semimetal oxide in aqueous solution to obtain mixture A.

The at least one compound used in step (A) of the process of the present invention as a precursor compound of the at least one metal and/or semimetal oxide can be any compound capable of conversion into the corresponding metal and/or semimetal oxide by reaction with at least one acid. In the preferred case, where the semimetal oxide is silicon dioxide, the precursor compound used is preferably sodium silicate $xNa_2O \cdot ySiO_2$ (water glass). A further preferred embodiment of the process of the present invention uses a sodium silicate solution in step (A) in which the $SiO_2:Na_2O$ molar ratio is generally in the range from 1 to 6, preferably in the range from 2 to 5 and more preferably in the range from 3 to 4, for example 3.4.

Further suitable precursor compounds are selected from the group consisting of alkali metal silicates, for example potassium silicate, alkaline earth metal silicates, colloidal silica sols and mixtures thereof.

In one preferred embodiment of the process of the present invention, the at least one precursor compound of the at least one metal and/or semimetal oxide is selected from the group consisting of alkali metal silicates, for example potassium silicate and/or sodium silicate, alkaline earth metal silicates, colloidal silica sols and mixtures thereof.

One particularly preferred embodiment utilizes an aqueous water glass solution, i.e., an aqueous solution of $xNa_2O \cdot ySiO_2$ in $H_2O$, having a density ranging from 1.1 to 1.35 g/cm³, particularly from 1.14 to 1.32 g/cm³, in step (A) of the process of the present invention. The at least one precursor compound of the at least one metal and/or semimetal oxide is used in mixture A in a concentration ranging from 1.5 to 4.5 mol*l⁻¹.

Step (A) of the process of the present invention can generally be carried out at any temperature at which the individual components are processible or to be more precise soluble. Step (A) preferably yields a two-phase mixture. The temperature in step (A) is for example in the range from 10 to 80° C., preferably in the range from 15 to 40° C., more preferably equal to ambient temperature.

Step (B):

Step (B) of the process of the present invention comprises providing a mixture comprising at least one at least partially water-miscible organic solvent, water and at least one acid as mixture B.

Step (B) of the process of the present invention can utilize all at least partially water-miscible organic solvents already mentioned with regard to step (A); n-butanol is preferably used in step (B). It is further preferable to use in step (B) at least one at least partially water-miscible solvent which is water-saturated.

Mixture B comprises at least one acid. Generally any acid can be used that is soluble in a mixture comprising at least one at least partially water-miscible organic solvent and water and that is capable of converting the at least one compound used in step (A) as a precursor to the at least one metal and/or semimetal oxide, into the corresponding metal and/or semimetal oxide. In one preferred embodiment, the at least one acid is selected from the group consisting of inorganic acids such as hydrochloric acid, nitric acid, sulfuric acid, sulfurous acid, phosphoric acid, phosphorous acid or organic acids such as formic acid, acetic acid, propionic acid, butyric acid and mixtures thereof. One particularly preferred embodiment uses sulfuric acid. As in step (A), tap water, drinking water, distilled water or demineralized water can be used and preferably distilled water is used.

One preferred embodiment comprises preparing mixture B in step (B) by admixing an aqueous solution of the at least one acid with the at least one organic solvent. This aqueous solution of the acid has an acid concentration in the range from 2% to 20% by weight, more preferably in the range from 3% to 15% by weight and particularly preferably in the range from 4% to 10% by weight.

The volume ratio of at least one at least partially water-miscible organic solvent to water in mixture B is generally in the range from 5:1 to 1:1 and preferably in the range from 4:1 to 2:1.

The temperature at which step (B) is carried out is generally in the range from 10 to 80° C., preferably in the range from 15 to 40° C. and more preferably equal to ambient temperature.

Step (C):

Step (C) comprises combining the mixtures A and B and reacting the at least one precursor compound of the at least one metal and/or semimetal oxide with the at least one acid to obtain a mixture C comprising an aqueous phase comprising the spherical beads and an organic phase.

The combining in step (C) of the process of the present invention can be effected by any method known to a person skilled in the art. In one preferred embodiment, the mixtures A and B are introduced into a reactor, for example a flask or reaction tube, simultaneously and thereby combined.

The reaction of the at least one precursor compound to the at least one metal and/or semimetal oxide with the at least one acid results in the formation of the at least one metal and/or semimetal oxide. The preferred case, where $SiO_2$ is formed from $xNa_2O \cdot ySiO_2$ and $H_2SO_4$ (aq.), involves the following reaction taking place:

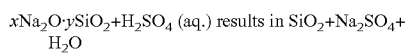

$xNa_2O \cdot ySiO_2 + H_2SO_4$ (aq.) results in $SiO_2 + Na_2SO_4 + H_2O$

Step (C) of the process of the present invention is preferably carried out continuously, for example in a flow tube. The temperature at which step (C) is carried out is generally in the range from 10 to 80° C., preferably in the range from 15 to 40° C. and more preferably equal to ambient temperature.

After the reaction of the at least one precursor compound and of the at least one acid has taken place, the spherical beads are present in dispersed form in mixture C.

Step (D):

Step (D) comprises separating the organic phase from the mixture C obtained in step (C) to obtain an aqueous phase comprising the spherical beads.

The separating of the organic phase from mixture C in step (D) of the process of the present invention can be carried out in any manner known to a person skilled in the art, for example by decanting off, sucking off, draining the lower phase off through a floor valve, etc. The choice of the best method depends inter alia on whether the organic solvent used has a density above or below 1 g/ml, i.e., on whether the organic phase is above or below the aqueous phase.

In one preferred embodiment, the mixture C comprises an upper organic and a lower aqueous phase in which the spherical beads of the present invention are present in dispersed form. In one preferred embodiment, step (D) is effected by sucking or pouring off the upper organic phase to obtain an aqueous phase comprising the spherical particles. The aqueous phase obtained after step (D) may still comprise residues of the at least one organic solvent, for example up to 15% by weight and preferably up to 10% by weight.

In one preferred embodiment of the process of the present invention, step (D) is followed by adjusting the aqueous phase comprising the spherical beads to a neutral pH, i.e., pH 6-8, by addition of a suitable reagent. In one preferred embodiment, this is effected by addition of an acid, for example a mineral acid such as sulfuric acid. The acid is preferably used as an aqueous solution having a concentration in the range from 20% to 60% by weight, preferably 30% to 50% by weight.

The neutralization is followed in one preferred embodiment by an aging step. For this, the spherical beads dispersed in water are heated to a temperature in the range from 40 to 95° C., preferably 50 to 90° C., for a certain period of time, for example 1 to 5 hours, preferably 2 to 4 hours.

Step (E):

The optional step (E) of the process of the present invention comprises treating the spherical beads obtained in step (D) with at least one acid.

Step (E) of the process of the present invention has the purpose, inter alia, of removing salts resulting from the preparation of the spherical beads and present on and in the beads, for example $Na_2SO_4$.

In one preferred embodiment, the optional step (E) first comprises removing the water above the spherical particles in a manner known to a person skilled in the art, for example by decanting off, sucking off, etc.

Preferably, the spherical particles are subsequently treated with an aqueous solution of an acid. Suitable acids are selected from the group consisting of inorganic acids such as hydrochloric acid, nitric acid, sulfuric acid, sulfurous acid, phosphoric acid, phosphorous acid or organic acids such as formic acid, acetic acid, propionic acid, butyric acid and mixtures thereof, particularly sulfuric acid. The aqueous solution in the optional step (E) preferably has a low concentration, for example a concentration in the range from 0.1% to 5% by weight, and preferably in the range from 0.75% to 2% by weight. After addition of the acidic solution, the mixture obtained is preferably commixed until homogeneous, for example by stirring with apparatus known to a person skilled in the art. Subsequently, the mixture obtained is left to stand quiescently for a certain period of time, for example in the range from 0.25 to 2 h and preferably in the range from 0.25 to 1 h. Subsequently, the supernatant acidic solution is preferably removed again, for example by decanting off and/or sucking off. The sequence of acid addition—stirring—allowing to stand—acid removal is repeated two or more times, for example 2 to 10 times.

Preferably, the spherical particles obtained are subsequently freed in a manner known to a person skilled in the art of disruptive components, for example acid, organic solvent and/or by-products formed in the formation of the at least one metal or semimetal oxide.

Step (F):

Step (F) of the process of the present invention comprises drying the spherical beads obtained in step (D) or (E).

The drying may be effected in any manner known to a person skilled in the art, for example in a drying cabinet at a temperature in the range from 100 to 300° C., preferably 150 to 250° C. Step (F) of the process of the present invention can be carried out at atmospheric pressure or at a lower pressure, for example at less than 800 mbar and preferably at less than 600 mbar.

Step (F) is carried on until the spherical beads have a water content which is sufficiently low for the later use, for example in the range from 0.2% to 0.8% by weight. This water content can be determined as loss on drying at 200° C.

The spherical beads produced according to the present invention are notable for a particularly advantageous combination of features such as diameter, BET surface area, pore volume, smoothness and monodispersity. It is particularly the pronounced spherical shape and smoothness which, when the spherical beads are used as catalyst carriers in polymerizations, engender the formation of particularly monodisperse and spherical particles of polymer.

Therefore, these spherical beads of the present invention are particularly useful as catalysts and catalyst carriers. Catalytically active metals, for example selected from the group consisting of chromium, magnesium, titanium, platinum, palladium, iridium, nickel, zirconium, zinc, copper, molybdenum, scandium and mixtures thereof, are applied to this end, if appropriate, to the particles of the present invention in amounts known to a person skilled in the art, for example 0.1% to 20% by weight, preferably 0.4% to 5% by weight, based on the overall particle. The identity and amount of the catalytically active metal is generally dependent on the desired use and known to a person skilled in the art.

The present invention thus also provides a particulate catalyst comprising the spherical beads of the present invention and at least one catalytically active metal. The amount which is present of the at least one catalytically active metal is preferably in a range from 0.1% to 20% by weight, preferably 0.4% to 5% by weight, all based on the overall particulate catalyst.

The present invention also provides for the use of the spherical beads of the present invention as catalysts or catalyst carriers, particularly in polymerization reactions, for example for producing polyethylene, polypropylene or other, specialty polymers.

FIGURES

FIG. 1 shows inventive spherical beads as a scanning electron micrograph.

Figure 2:
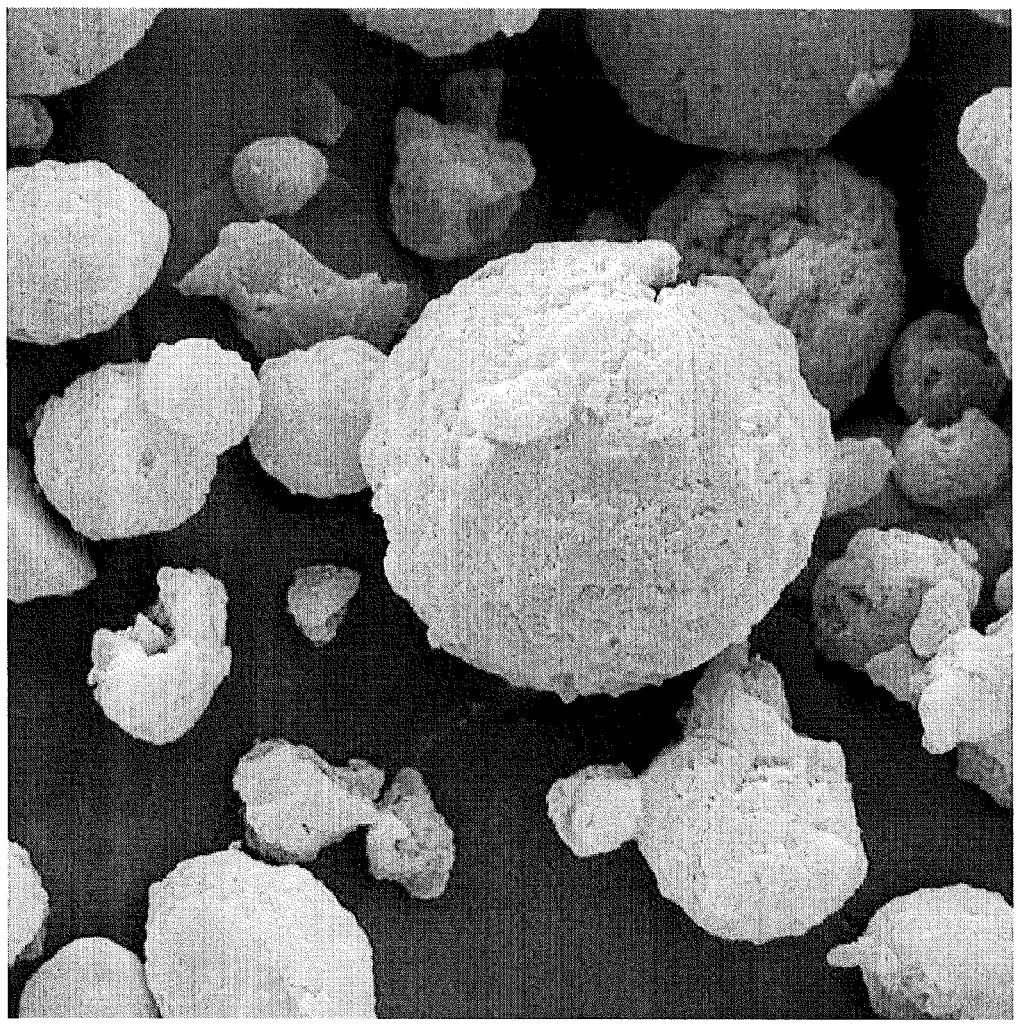
FIG. 2 shows for comparison a typical spray-dried silica gel as per the prior art.

FIG. 2 shows for comparison a typical spray-dried silica gel as per the prior art.

EXAMPLES

Apparatus two explosion-protected compressed-air stirrer drives of the PLR 11T type from Buddeberg
two ViscoJet 120 mm stirring elements
two 10 liter jacketed glass reactors with cooling water and protective gas supply
a peristaltic pump with 2 channels, for mixing the substrates initially charged to the two jacketed glass reactors
several 10 liter receiving vessels
10 liter glass bottle Chemicals:
1. 2 liters of 5.2% sulfuric acid
2. 2 liters of water glass solution having a density of 1.269 g/cm$^3$
3. 2 times 6 liters of n-butanol, technical grade, water-saturated
4. about 40% sulfuric acid for neutralization
5. about 10 liters of 1% sulfuric acid Procedure:

Precipitation:

After the jacketed reactors have each been filled with 6 liters of n-butanol, the stirrer drives are adjusted to about 500 rpm. Then, the dilute sulfuric acid is introduced into one container and the water glass solution into the other. On completion of the addition and emulsification, stirrer speed is lowered to about 300 rpm in both cases. Using a pump, the emulsions thus prepared are converged from the receiving containers in a tube and subsequently emptied into a mobile receiver.

After precipitation, the mixture of n-butanol and silica gel is separated. By addition of 40% sulfuric acid the pH of the silica gel mass is immediately adjusted to the range between 6.5 and 7.5.

Aging:

The neutralized silica gel is placed in a 10 liter glass bottle and transferred into a warm water bath at 80° C. for about 2.5 hours.

Ion Exchange and Washing:

After the liquid above the silica gel has been sucked off, a 1% $H_2SO_4$ solution (a wide concentration range extending from 0.5% to 15% is possible) is added. An hour later, the supernatant solution is again sucked off and then the silica gel is again admixed with 1% $H_2SO_4$ solution. This operation is repeated up to five times before the silica gel is admixed with water. This operation is repeated.

The spherical beads obtained are separated off by sucking off the supernatant liquid.

Drying:

The silica gel is dried at 170° C. in a drying cabinet.

Analytical Data:

Chemical Composition of Spherical Particles (Measured by Means of XRF to DIN 51418):

$SiO_2$>98%

Traces of Al, Na, Fe, sulfate and chloride (each <0.01%)

Generally:

| Color | white |
|---|---|
| Bulk density | 0.18 kg/l (measured to DIN 8948/7.6) |

Particle Size Distribution (Measured to ISO 13320):
All data apply to unsieved/unclassified material:
$D_{10}$=16 μm
$D_{50}$=55 μm
$D_{90}$=96 μm
BET Surface Area and Pore Volume (Measured to DIN 66134):
BET surface area (dried hydrogel): 550 m²/g
Pore volume of dried hydrogel: 1.7 cm³/g

We claim:

1. A process for producing spherical beads comprising at least one metal oxide and/or semimetal oxide, having a mean diameter in the range from 10 to 120 μm, a BET surface area in the range from 400 to 800 m²/g and a pore volume in the range from 0.3 to 3.0 cm³/g, wherein the diameter of a given bead at any one point of said bead deviates by less than 10% from the average diameter of said bead and the surface of said bead is substantially smooth, said process comprising the steps:
   (A) providing a mixture comprising at least one at least partially water-miscible organic solvent, water and at least one precursor compound of the at least one metal and/or semimetal oxide as mixture A,
   (B) providing a mixture comprising at least one at least partially water-miscible organic solvent, water and at least one acid as mixture B,
   (C) combining the mixtures A and B and reacting the at least one precursor compound of the at least one metal and/or semimetal oxide with said at least one acid to obtain a mixture C comprising an aqueous phase comprising the spherical beads and an organic phase,
   (D) separating the organic phase from the mixture C obtained in step C to obtain an aqueous phase comprising the spherical beads,
   (E) optionally treating the spherical beads obtained in step (D) with at least one acid, and
   (F) drying the spherical beads obtained in step (D) or (E),
wherein the at least one precursor compound of the at least one metal oxide and/or semimetal oxide is selected from the group consisting of alkali metal silicates, alkaline earth metal silicates, colloidal silica sols, and mixtures thereof.

2. The process of claim 1 wherein the at least one precursor compound of the at least one metal oxide and/or semimetal oxide is selected from the group consisting of potassium silicate, sodium silicate, alkaline earth metal silicates, colloidal silica sols, and mixtures thereof.

3. The process of claim 1, wherein the beads consist of $SiO_2$ to an extent of at least 96% by weight.

4. The process of claim 1, wherein the at least one metal oxide and/or semimetal oxide is substantially amorphous.

5. The process of claim 1, wherein the BET surface area is in the range from 500 to 600 m²/g.

6. The process of claim 1, wherein the pore volume is in the range from 1.5 to 2.5 cm³/g.

* * * * *